United States Patent Office 3,359,209
Patented Dec. 19, 1967

3,359,209
COMPOSITION AND METHOD OF INHIBITING CORROSION OF CUPREOUS METALS BY AMINE-STABILIZED UNSATURATED CHLORINATED HYDROCARBONS
Wilbur H. Petering and William A. Callahan, Detroit, Mich., assignors to Detrex Chemical Industries, Inc., Detroit, Mich., a corporation of Michigan
No Drawing. Filed Feb. 27, 1962, Ser. No. 176,096
The portion of the term of the patent subsequent to Apr. 24, 1979, has been disclaimed
5 Claims. (Cl. 252—153)

This application is a continuation-in-part application of applicants' copending application Ser. No. 741,001 filed June 10, 1958 (now Patent No. 3,031,410), which application is a continuation-in-part application of applicants' application Ser. No. 445,474 filed July 23, 1954, and now abandoned. It is also a continuation-in-part application of applicants' copending application Ser. No. 26,942, filed May 5, 1960, now Patent No. 3,133,885.

This invention relates to a method of inhibiting the tarring and corrosion of cupreous metals in the liquid phase of certain hot, dry, amine-stabilized unsaturated chlorinated hydrocarbons. Among the unsaturated chlorinated hydrocarbons to which the composition and method of the present invention are applicable are trichlorethylene and perchlorethylene.

It is conventional to add stabilizers of various types to chlorinated hydrocarbons. Among the accepted stabilizers are phenolic compounds, amines and various azo compounds. However, the choice of such compounds is quite limited, except in the case of a few higher boiling unsaturated chlorinated hydrocarbons, since most compounds which possess stabilizing properties also have relatively high boiling points. A wide difference in boiling points between a particular solvent and the stabilizer chosen for such solvent is undesirable in metal degreasing and solvent distillation applications because of an undesirable stabilizer distribution between the liquid and the vapor phase. It is therefore desirable to provide a combination of solvent and stabilizer not having a wide difference in boiling points.

The organic amine bases have long enjoyed widespread use as stabilizers for unsaturated chlorinated hydrocarbons. Such bases, including aliphatic amines and basic cyclic compounds characterized by nitrogen in the ring, such as pyridine and the like, are disclosed in the U.S. Patents to Dinley, Nos. 2,096,735, 2,096,736 and 2,096,737. Under many conditions the volatile aliphatic amine and/or heterocyclic nitrogen bases disclosed in the Dinley patents are highly effective and desirable stabilizers for unsaturated chlorinated hydrocarbons. However, these stabilizers, as disclosed by Dinley, must boil fairly close to the solvent stabilized to have any real utility in metal degreasing or solvent distillation.

Among the suitable amines are pyridine, disecondary butylamine, diisopropylamine, diethylamine, n-butylamine, amylamines, methyl pyridines, N-methyl morpholine, triethylamine and hexylamines.

In referring to "amines" the term is used to include other organic bases specified in the Dinley patents, including cyclic compounds characterized by nitrogen in the ring such as pyridine and morpholine, for example.

In the manufacture of unsaturated chlorinated hydrocarbons such as trichlorethylene, for example, the recovery of a neutral, sweet, relatively pure product is almost impossible without the use of a stabilizer such as an amine. The amine stabilizer should be present in the refining operation, as distinguished from adding amine to the refined product, and the amine should be volatile with the trichlorethylene and therefore carry over from the refining operation into the refined product. Unless a neutral, sweet product is obtained when the solvent is refined, subsequent attempts to stabilize the solvent often prove futile, or at least extremely costly and time consuming. Thus, the amines are not only highly effective and desirable stabilizers, but their use in both the liquid and vapor in the last stages of manufacture is almost essential.

Yet, in spite of the effectiveness and desirability of the amines as stabilizers, there appears to be an undesirable reaction, or set of reactions which take place when the amines are used as stabilizers in unsaturated chlorinated hydrocarbon solvents in the presence of cupreous metals or their alloys. It has been found that lower boiling unsaturated chlorinated hydrocarbons such as trichlorethylene or perchlorethylene, when stabilized with any of the commonly used organic amine stabilizers, appear to enter into a complex reaction when exposed to cupreous metal, with resulting tarring and corrosion of the exposed metal surfaces.

While the tarring and corrosive action of the amine-chlorinated hydrocarbon system is observed with respect to copper (alone or in its alloyed forms), aluminum on the other hand, which is known to be an agent for metal or metal chloride induced solvent decomposition in some cases, does not initiate the tarring and corrosion reaction in amine stabilized systems.

The type of solvent breakdown encountered when aluminum is converted to aluminum chloride and the resulting aluminum chloride is brought into contact with trichlorethylene, for example, is a reaction of an entirely different type than that here under discussion. Aluminum chloride catalyzes a particularly drastic conversion of trichlorethylene into coke, tar and hydrogen chloride. The mere presence of a metal atom is apparently not the determinative factor, since, for example, ferric chloride or copper chloride do not have this effect on trichlorethylene.

It also seems to be necessary that the amine-chlorinated hydrocarbon system be hot and dry in order for the tarring and corrosion reaction to take place. It will of course be well known to those skilled in the art that chlorinated solvents of the type under discussion are self-drying when boiled. This follows from the well-known fact that these compounds have steam distillation points below the boiling points of both the chlorinated solvent and of water. These boiling points are as follows:

|  | °C. |
|---|---|
| Trichlorethylene | 86.7 |
| Perchlorethylene | 121.4 |
| Water | 100 |
| Trichlorethylene-water | 73.3 |
| Perchlorethylene-water | 87.7 |

The exact mechanism by which the amine, the chlorinated solvent and the metal react to give the tarring and corrosion is not completely known or understood. The end products of this reaction are more or less complex metallo-organic chlorocompounds. It is necessary that all three components, i.e. the metal, the amine and the chlorinated solvent be present for the reaction to take place at all.

Regardless of what the true explanation of the phenomenon may be, serious tarring and corrosion problems are encountered when an unsaturated chlorinated hydrocarbon is stabilized with an amine and the product exposed to cupreous metal, particularly when the chlorinated hydrocarbon is hot and bone-dry.

It is accordingly an object of this invention to provide a method for overcoming the foregoing disadvantages, thereby providing an improved tarring and corrosion inhibiting stabilizer composition for the lower boiling unsaturated chlorinated hydrocarbons. Other objects and advantages of this invention will further appear hereinafter.

In accordance with this invention, the tarring and corrosive action of organic amines in the presence of cupreous metals and certain chlorinated hydrocarbons is inhibited by incorporating into the mixture a small amount of a glycidyl ether, which interferes with the corrosive action of the system in the presence of cupreous metals. The glycidyl ether does not interfere with the stabilizing action of the amine, or its ability to act as an alkaline material, or as a reducing agent, or as an anti-oxidant. It appears that these glycidyl ethers may act to retard or interfere with the tarring and corrosive activity of the amine stabilized system or by forming a protective layer over the surface of the metal. In the former case the amount of glycidyl ether required to control the action of the amine would be related to the amount of amine used, while in the latter case the amount of glycidyl ether required would be related to the surface area of the metal exposed to the solvent and amine. The amount of glycidyl ether required seems to be related to the amount of amine.

It has been found that metal tarring and corrosion which occurs in the amine-chlorinated solvent-metal system containing only the usual stabilizing amount of amine can be reduced by using much larger quantities of amine. This larger quantity of amine may be of the order to ten times or more the usual stabilizing amount. It is believed that these very large quantities of amine may form a protective coating on the metal surface, thus interfering with the reaction between the amine, the chlorinated solvent and the metal. This method of controlling the tarring and corrosion of the metal is not desirable because the normal gradual reduction in amine content during use will bring the amine concentration into the range where the tarring and corrosion of the metal will rapidly increase and the difficulties described above be encountered; moreover, the use of such large amounts of amine greatly increase solvent stabilization costs and may introduce highly objectionable odors into solvent.

The glycidyl ethers which are useful in accordance with this invention have the following general formula

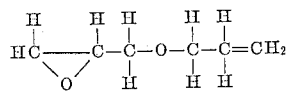

where R is a hydrocarbon radical chosen from the group consisting of methyl, ethyl, propyl and allyl. The following glycidyl ethers are illustrative:

(1) Glycidyl methyl ether

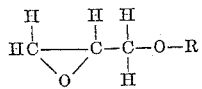

(2) Glycidyl ethyl ether

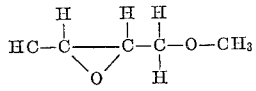

(3) Glycidyl isopropyl ether

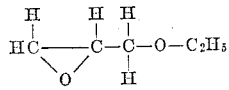

(4) Glycidyl allyl ether

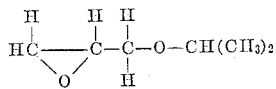

It is well known in the art that the proportion or concentration of amine stabilizers may vary from trace values (0.01% or less) to as high as 1.0% by weight of the chlorinated hydrocarbon. However, a range of about 0.01–0.20% by weight represents the proportions considered commercially preferable in most amine-stabilized chlorinated hydrocarbons. Amine stabilizers have long been well known and extensively used, and different amines have been used in various proportions for individual chlorinated hydrocarbons. The art is well aware of the proper concentration range of each specific amine stabilizer in each specific chlorinated hydrocarbon, and such concentrations are conventionally referred to as "stabilizing amounts" or "stabilizing proportions" and are so defined herein.

The concentration of the glycidyl ether may be varied from about 0.01% to about 5% by weight, but a range of about 0.01% to 1.0% by weight is preferred. Preferably, the concentration of the glycidyl ether corrosion inhibitor is about 1 to 5 times the concentration of the amine stabilizer. This preferred concentration of the corrosion inhibitive glycidyl ether is referred to as an "inhibitive concentration" or "inhibitive proportion" and is so defined herein.

The tarring and corrosive effects of amine-stabilized solvents, the tarring and corrosion inhibiting effect of the glycidyl ethers, the solvent stabilizing effects of amines and the lack of solvent stabilizing effects of the glycidyl ethers can be shown by simple tests. These tests involve periods of refluxing of solvent samples with weighed cupreous strips partially immersed in the liquid phase of the solvent. The metal strips are, however, short enough to be contained entirely within the boiling flask used and do not extend into the reflux condenser. A group of tests is run to compare the effects of various systems. A typical group consists of the following samples:

a. Solvent and metal strip
b. Amine-stabilized solvent and metal strip
c. Amine-stabilized solvent, glycidyl ether and metal strip
d. Solvent, glycidyl ether and metal strip The typical results of each of these tests may be summarized as follows:

*Test a.*—The cupreous metal strip was in good condition after reflux, showing very little or no corrosion or tarring. The solvent showed definite signs of breakdown as would be expected.

*Test b.*—The cupreous metal strip showed considerable tarring and corrosion after reflux. While the degree of tarring and corrosion varied somewhat with different amines, the characteristic tarring and corrosion by amine-stabilized solvent was always apparent. The solvent showed varying degrees of breakdown from almost none to considerable, depending on the length of the test and the amine chosen.

*Test c.*—The cupreous metal strip showed drastically reduced tarring and corrosion. The solvent showed varying degrees of breakdown from almost none to considerable, depending on the length of the test and the amine chosen.

*Test d.*—The cupreous metal strip was in good condition after reflux, showing very little or no corrosion or tarring. The solvent showed definite signs of breakdown.

In order to show the general tarring and corrosive effect of hot dry amine-stabilized solvents on copper, a series of tests was run in which trichlorethylene and perchlorethylene stabilized by various amines were refluxed in the presence of copper strips. The results of these tests are shown in the following tables:

TABLE I.—TARRING AND CORROSIVE EFFECT OF AMINE-STABILIZED TRICHLORETHYLENE ON COPPER

| Amine | Percent by wt. | Hours of test | Metal loss, mgm./ft.$^2$ | Extent of tarring |
|---|---|---|---|---|
| Pyridine | 0.12 | 192 | 6,600 | Very severe |
| Do | 0.12 | | | Do. |
| Triethylamine | 0.02 | 192 | 6,070 | |
| Diisopropylamine | 0.10 | 192 | 463 | Moderate. |
| Do | 0.10 | | | Do. |
| Triethylamine | 0.02 | 192 | 594 | |
| None | | 192 | None | None. |

TABLE II.—TARRING AND CORROSIVE EFFECT OF AMINE STABILIZED PERCHLOROETHYLENE ON COPPER

| Amine | Percent by wt. | Hours of test | Metal loss, mgm./ft.$^2$ | Extent of tarring |
|---|---|---|---|---|
| Triethylamine | 0.02 | 72 | 1,405 | Severe. |
| Do | 0.02 | 72 | 1,320 | Do. |
| N-methyl morpholine | 0.02 | 63 | 893 | Moderate. |
| None | | 72 | 85 | Very slight. |

It will be seen from the above that stabilizing amounts of volatile aliphatic amines and heterocyclic nitrogen bases give rise to tarring and corrosion when hot dry amine stabilized solvent is in contact with cupreous metals. The amines chosen and used above are those most commonly used in solvent stabilization. Since pyrrole is not commonly considered to be basic it is excluded from the group of amines discussed here.

In order to show the effect of glycidyl ethers in inhibiting the tarring and corrosion shown in Tables I and II, a series of tests are run in which trichlorethylene and perchlorethylene stabilized by various amines are refluxed in the presence of cupreous strips after various glycidyl ethers are added to the solvents. Results of these tests are shown in the following table:

This is because the immediate products of breakdown are substances such as phosgene. Phosgene itself is a gas which is insoluble in boiling solvent. The phosgene is therefore removed from the system as fast as it is formed and, in the absence of water, cannot be hydrolyzed to form hydrogen chloride. Phosgene itself is not an acid. It yields acidic products by hydrolysis, which requires the presence of water. As previously pointed out, boiling liquid solvent contains no water.

In the refining of crude unsaturated chlorinated hydrocarbons it is usual to add a stabilizing proportion of an amine prior to the actual refining operation, which is usually accomplished by fractional distillation. In accordance with this invention, the stabilized crude solvent may be combined with an inhibitive proportion of a glycidyl ether tarring and corrosion inhibitor. The boiling points of certain of the glycidyl ether compounds are as follows:

° C.
Methyl glycidyl ether _____ 111
Ethyl glycidyl ether _____ 126
Isopropyl glycidyl ether _____ 137
Allyl glycidyl ether _____ 154

A glycidyl ether is chosen whose boiling point is such that it will tend to concentrate in the reboiler of the still. This requires that the composition of the crude mixture to be fractionated be taken into account. Since the severe corrosion problem occurs in the substantially anhydrous liquid phase mixture in the reboiler, the glycidyl ether will be present at the location where it is most needed. The volatile amine will stabilize both the liquid and vapor phases throughout the still.

Unsaturated chlorinated hydrocarbons such as trichlorethylene and perchlorethylene are widely used as degreasing solvents, cleaners and the like. For example, ferrous and cupreous metals are degreased commercially by exposure to liquid phase solvents. Even in a vapor degreaser work is exposed to liquid solvent because the solvent vapors are used to heat the work to the boiling point TABLE III.—GLYCIDYL ETHER INHIBITION OF AMINE-STABILIZED SOLVENT CORROSION AND TARRING OF COPPER

| Solvent | Amine | Percent by wt. | Ether | Percent by wt. | Tarring | Metal Erosion |
|---|---|---|---|---|---|---|
| Trichlorethylene | Triethylamine | 0.02 | Glycidyl methyl | 0.10 | None | None. |
| Perchlorethylene | Me Morpholine | 0.02 | Glycidyl isopropyl | 0.10 | Very, very faint line at interface of liquid and vapor. | Do. |
| Trichlorethylene | Pyridine | 0.10 | Glycidyl ethyl | 0.20 | None | Do. |
| Do | Triethylamine | 0.20 | Glycidyl methyl | 0.05 | Very, very slight line at interface. | Do. |
| Do | Diisopropylamine | 0.03 | ___do___ | 0.05 | None | Do. |
| Perchlorethylene | N Methyl Morpholine | 0.02 | Glycidyl ethyl | 0.10 | Very, very slight line at interface. | Do. |
| Do | Pyridine | 0.02 | Glycidyl isopropyl ether | 0.10 | Slight line at interface | Very slight. |
| Do | N Me Morpholine | 0.02 | Glycidyl ethyl | 0.10 | None | None. |

The above data indicates that tarring and corrosion occur in the presence of the amine stabilizer. This necessarily means that these deleterious effects occur in the presence of stabilized solvent. This is further confirmed by the fact that cupreous metal does not appreciably tar or corrode when refluxed in the presence of unstabilized or even badly degenerated solvent. The glycidyl ether does not itself stabilize the solvent. The absence of tarring and corrosion when a cupreous metal strip is refluxed in unstabilized solvent may be ascribed to the absence of both amine and water. The cupreous metal does not show tarring and corrosion resulting from the solvent-amine-metal complex reaction because one of the components of the system which induces the tarring and corrosion is absent. The cupreous metal strip does not show acid corrosion because no acid, as such, is present. When trichlorethylene or perchlorethylene break down under normal conditions to give acidic products such as hydrogen chloride, the presence of some water is indispensable.

of the solvent. It therefore follows that some danger of corrosion of both the degreasing apparatus and the work exists in the use of the amine stabilized solvent in degreasing. Accordingly, it is commercially advantageous to provide a chlorinated hydrocarbon solvent containing both an amine and a glycidyl ether in accordance with this invention.

Having thus described our invention, we claim:

1. In a process wherein cupreous metal is exposed to a hot anhydrous chlorinated hydrocarbon solvent selected from the class consisting of trichlorethylene and perchlorethylene, said solvent containing a basic organic amine stabilizer selected from the class consisting of pyridine, disecondary butylamine, diisopropylamine, n-butylamine, amylamine, methyl pyridine, N-methyl morpholine, triethylamine in an amount of from about .01% to about 1.0% by weight of said solvent, said stabilized solvent normally causing corrosion of the cupreous metal, the improvement which comprises the step of incorporating into said stabilized chlorinated hydrocarbon solvent about .01% to about 5% by weight of an inhibitor for said corrosion comprising a glycidyl ether having the general formula

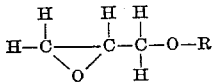

where R is a hydrocarbon radical chosen from the group consisting of methyl, ethyl, isopropyl and allyl.

2. The process in accordance with claim 1 wherein the glycidyl ether is methyl glycidyl ether.

3. The process in accordance with claim 1 wherein the glycidyl ether is ethyl glycidyl ether.

4. The process in accordance with claim 1 wherein the glycidyl ether is isopropyl glycidyl ether.

5. The process in accordance with claim 1 wherein the glycidyl ether is allyl glycidyl ether.

References Cited

UNITED STATES PATENTS 2,395,285  2/1946  McKibben _____ 75—125
3,031,410  4/1962  Petering et al. _____ 252—171

LEON D. ROSDOL, *Primary Examiner.*

JULIUS GREENWALD, *Examiner.*

J. T. FEDIGAN, *Assistant Examiner.*

UNITED STATES PATENT OFFICE
CERTIFICATE OF CORRECTION

Patent No. 3,359,209                      December 19, 1967

Wilbur H. Petering et al.

It is hereby certified that error appears in the above numbered patent requiring correction and that the said Letters Patent should read as corrected below.

Column 4, line 64, for "drastically" read -- dramatically --; columns 5 and 6, TABLE III, third column, line 4 thereof, for "0.20" read -- 0.02 --.

Signed and sealed this 6th day of May 1969.

(SEAL)
Attest:

Edward M. Fletcher, Jr.
Attesting Officer

Commissioner of Patents